United States Patent [19]
Clark

[11] 3,915,312
[45] Oct. 28, 1975

[54] WORKPIECE TRANSFER SYSTEM
[75] Inventor: Harry S. Clark, Boulder City, Nev.
[73] Assignee: Harry S. Clark, Boulder City, Nev.
[22] Filed: Feb. 19, 1974
[21] Appl. No.: 443,320

[52] U.S. Cl. ............... 214/1 BB; 83/409; 214/1 BT
[51] Int. Cl.² ........................................ B65G 61/00
[58] Field of Search .......... 83/409; 214/1 BT, 1 BD, 214/1 BB, 1 BV, 1 B, 1 BS, 1 BH, 1 BC; 198/22 R, 20 R, 75

[56] References Cited
UNITED STATES PATENTS
2,662,646  12/1953  McCain ........................ 214/1 BB
3,179,262  4/1965  Carlson, Jr. et al. ......... 214/1 BT X
3,302,803  2/1967  Mooney ............................ 198/20 X Primary Examiner—Frank E. Werner

[57] ABSTRACT

A system for transferring workpieces, such as press blanks, from an operator's work station first to a transfer station and then to a receiving station in a modifying machine, such as a press, along two different paths such that the operator's hand cannot be transferred from the work station into the receiving station of the press or other modifying machine, is disclosed.

7 Claims, 6 Drawing Figures

WORKPIECE TRANSFER SYSTEM

Nests for use in this system are described in my copending patent application entitled "Method For Forming Transfer Nests" Ser. No. 443,321, filed concurrently herewith.

This invention relates to safety devices for use in connection with punch presses, drill presses, milling machines, and other workpiece modifying machines. More particularly, this invention relates to methods for transferring workpieces from an outside operator's work station, which is located a safe distance from the modifying machine along two different paths to the receiving station of the modifying machine, such that the operator's hand cannot be transported by the transfer system into the press or other modifying machine.

Automatic material handling devices of many types are well known in the prior art. For example, automatic press material handling apparatus are described in U.S. Pat. No. 3,039,623 F. J. Sehn et al. Sehn et al discloses a vacuum pick up head operated by a venturi which is adapted to deliver an article to a machine, such as a press, or remove an article from such a machine, but positioning and orientation of the workpiece is not certain and the transfer system moves directly from one position to another and, consequently, could be capable of moving the operator's hand into the dangerous portion of the receiving station of the modifying machine. Another apparatus generally of this type is disclosed in the Sehn et al U.S. Pat. No. 3,091,347.

Other transporting apparatus are disclosed in U.S. Pat. No. 3,087,629, F. P. Sharpe; U.S. Pat. No. 2,943,750, F. J. Sehn et al; U.S. Pat. No. 3,075,651, M. Kaden; and U.S. Pat. Nos. 2,899,043, 2,894,616, J. R. Young. Vacuum pick up devices for various articles ranging from bakery pans to bakery products, for example, are also known, see for example U.S. Pat. Nos. 2,294,274, Bauxbaum; 3,272,350, Pflaumer, et al; 3,415,388, Hornlein et al; and 3,502,236, Stadelman. But these patents do not address themselves to the problem to which this invention is directed and do not offer a satisfactory solution to this problem.

The present invention relates to a particular type of system which uses standard mechanical, pneumatic, hydraulic, or other devices and may use devices or components of the type described in the preceding patents. The reader is referred to standard engineering handbooks and design books for information and details concerning various standard mechanisms including: Colvin and Stanley, AMERICAN MACHINISTS HANDBOOK; Stanley, PUNCHES AND DIES; Colvin and Haas, JIGS AND FIXTURES; Hyland and Kommers, MACHINE DESIGN; McNeal, HYDRAULIC OPERATION AND CONTROL OF MACHINES; Herkimer, ENGINEERS' ILLUSTRATED THESAURUS; and current standard mechanical engineers handbooks, all of which are incorporated by reference as well as the previously referred to patents, which do not constitute a comprehensive collection of prior art, but are merely referred to as exemplary.

One of the features of this invention is that the workpiece is carried from the operator's work station into the receiving station of the press or other modifying machine, along two differently directed paths with a transfer in between. This assures that the operator's hand cannot be carried into the receiving station of the press or other modifying machine. The problems connected with the operator placing the workpiece directly in the press and associated with transfer mechanisms in which the operator's hand could be carried by the transfer system into the press are avoided.

Another feature of the invention is that the workpiece is transported from the operator's work station, which is located safely outside of, and spaced from, the receiving station of the press or other modifying machine, to the receiving station and arrives at the receiving station and is deposited in proper position and orientation for being worked upon.

The present invention is designed for use in combination with a workpiece modifying machine, such as a punch press, a drill press, a milling machine, or the like which include a workpiece receiving station and means proximate to the receiving station for modifying the workpiece. The modifying machine discussed hereinafter as exemplary is the typical punch press, in which the workpiece is placed on or adjacent a die and is modified by a moving punch which engages the workpiece and co-acts with the workpiece and the die to shape the workpiece. It will be understood, however, that since the modifying machine itself is not part of the invention any type of workpiece modifying machine may be used in connection with the invention. The invention is a transfer system for transferring a workpiece from a safe external loading station where the operator works to such a receiving station in the modifying machine.

The transfer system includes a transfer nest for receiving the workpiece in a predetermined relationship, with respect to the position in which the workpiece must be positioned when it is received at the work station in the modifying machine. This position may include centered or off-center position and angular orientation, as well as tilt, etc. The system also includes a nest transfer system for transporting the transfer nest from the loading station to an intermediate transfer station which is spaced from both the receiving station and loading station. The nest transfer assembly is moved along a first path which does not lead to the receiving station and, consequently, the worker's hand cannot be transported into the dangerous receiving station of the press or other modifying machine. A feeder nest for receiving the workpiece from the transfer nest in the proper relationship, means for transferring the workpiece from the transfer nest to the feeder nest in that proper relationship, and a feeder transfer assembly for transporting the feeding nest along a second path, carrying the workpiece in proper position and orientation, from the transfer station to the receiving station in the modifying machine completes the transfer system of the invention. This system permits the worker to place the workpiece in the proper relationship in the transfer nest at the loading station from which it is transported to the transfer station and then to the receiving station and arrives in proper position for being modified by the workpiece, all without risk of injury to the worker by the modifying machine.

The foregoing features and advantages will become more apparent from consideration of the following description and from the drawings in which.

Figure 1:
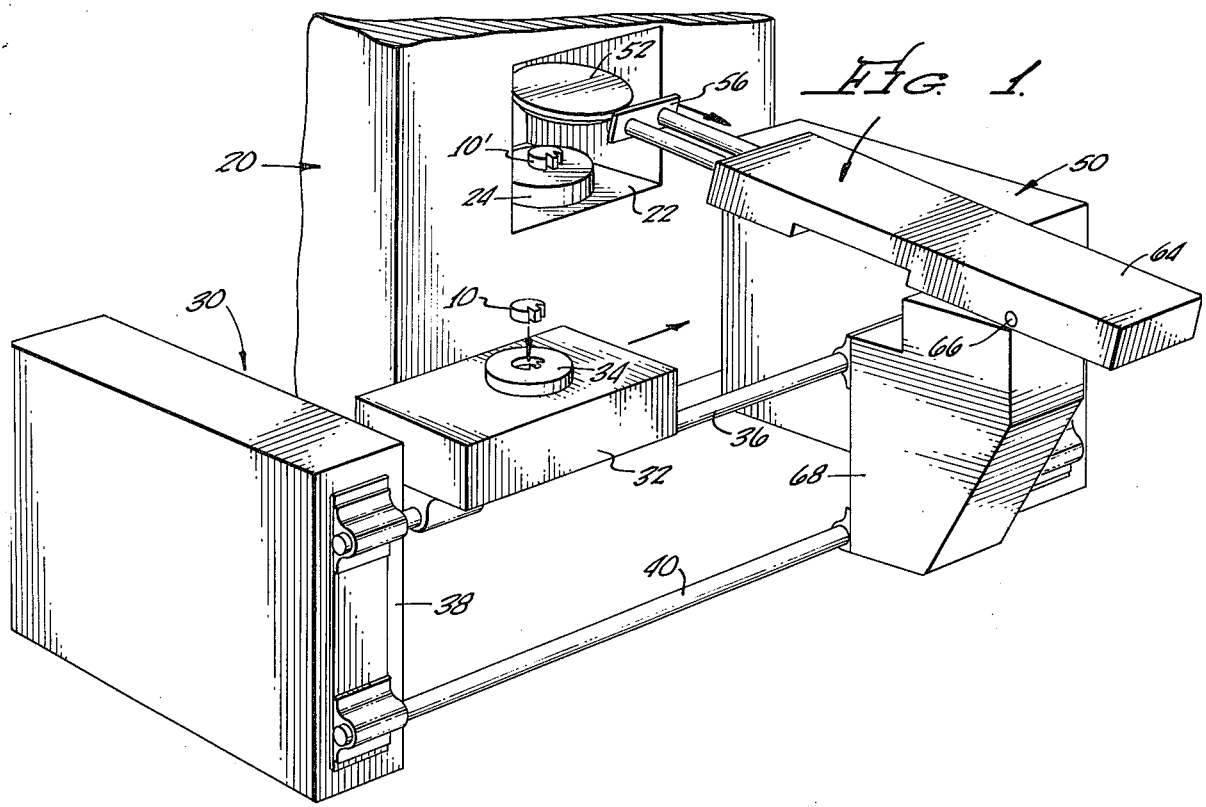
FIG. 1 is a preferred embodiment of the invention for use in connection with a punch press, showing the transfer nest at the loading station and the feeder nest at the press receiving station.

Referring to the drawings, FIG. 1, the present invention is a system for transporting a workpiece, an exemplary workpiece being indicated at 10, into proper position in a punch press or other modifying machine indicated generally at 20. The punch press may typically include a receiving station indicated generally at 22 and a die 24 on which the workpiece is received and a punch 26 which co-acts with the die to modify the workpiece in some predetermined manner.

The exemplary workpiece is illustrated as having a particular configuration such that it must be positioned in the press in proper relationship with respect to the center of the die as well as in proper angular orientation in order for the press properly to perform its modifying function. When the workpiece is in proper position on the die, the punch will modify the shape of the workpiece to produce the desired end result; whereas, if the workpiece was misplaced on the die such as by being angularly oriented improperly or being positioned improperly with respect to center, etc., the modification process would be ineffective to produce the desired configuration of finished article.

It will be understood, of course, that the illustrations in the drawings are simply to illustrate the principle mode and mechanism of operation of the apparatus rather than to define the modification of any particular workpiece.

The system includes a transfer sub-system indicated generally at 30 which includes a transfer assembly 32 part of which is a transfer nest 34. The transfer nest 34 is typically of the type manufactured according to the process described in my aforesaid co-pending application filed concurrently herewith. The transfer nest has a recess in it of a size and configuration to receive workpieces only in a position relative to the proper position of the workpiece in the receiving station, such that when the workpiece is transferred it will arrive at the receiving station in the proper position for being modified. The workpiece may be oriented angularly the same in the loading station or it may be oriented differently at the loading station, depending upon the exact paths of transport, but the relationship of the workpiece at the loading station is always the same with respect to the proper position of the workpiece in the punch press, or other modifying machine.

The nest transfer system includes a workpiece transfer nest assembly track 36 which may simply be a threaded bar as illustrated, a pair of bars, or other means for guiding the nest transfer assembly along a first path, which is not directed toward and into the receiving station, to the transfer station. The nest transfer system may include additional positioning elements such as the bar 40, and will include such brackets, guides, etc., as are conventionally provided in the design of industrial machinery.

Figure 2:
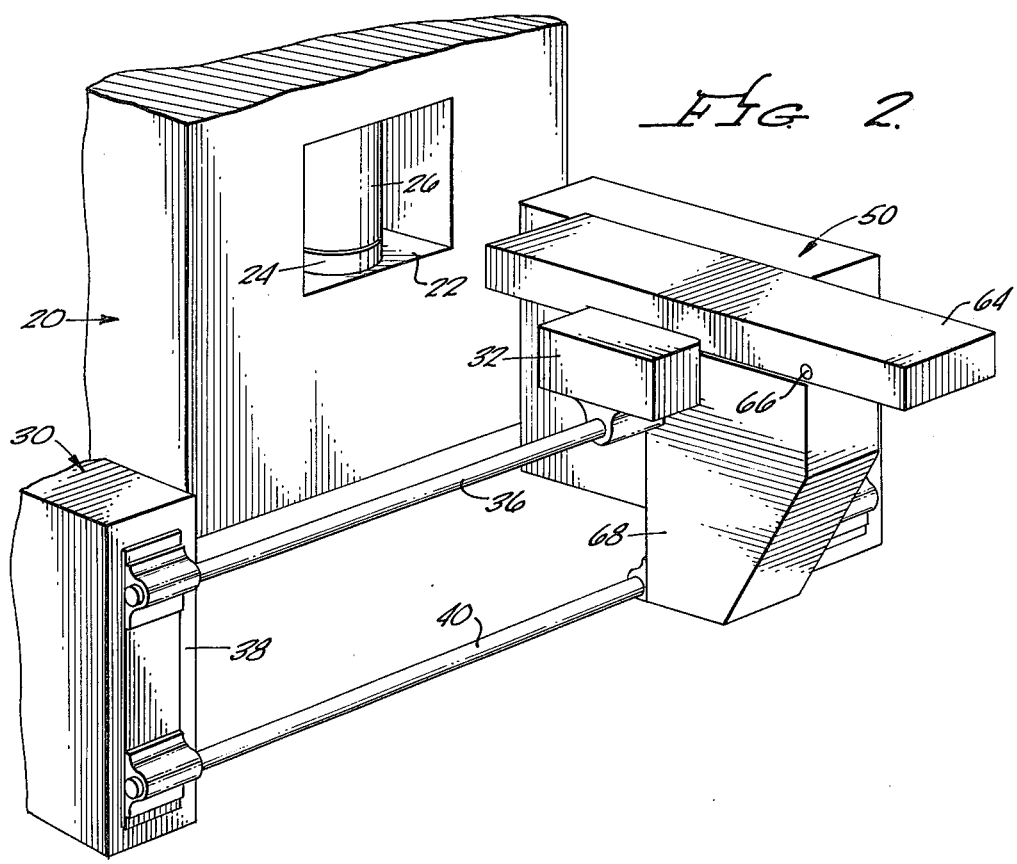
FIG. 2 is the same system showing the transfer nest and the feeder nest at the transfer station in transfer position.

The nest or transfer assembly may be moved by hand from its loading station, as shown in FIG. 1, to the transfer station in FIG. 2, but more commonly it would move automatically from the loading station to the transfer station. Any convenient means for moving the nest transfer assembly back and forth, reciprocally, between the loading station and the transfer station may be provided. Such means may include a threaded bar 36 which, in the embodiment illustrated, constitutes the nest transfer assembly track or pneumatically or hydraulically actuated linear motors, such as for example, the conventional hydraulic or pneumatic ram, or other hydraulic pumps or motors such as is described in Chapter 3 of McNeal, HYDRAULIC OPERATION AND CONTROL OF MACHINES and may include controls to automatically cause the nest transfer assembly to move reciprocally from one position to another. Such controls are described in McNeal, HYDRAULIC OPERATION AND CONTROL OF MACHINES, as well as in many other standard hydraulic and mechanical design handbooks. Link transfer mechanisms and other transfer mechanisms may likewise be used. In the illustrated embodiment, the shaft 36 may be threaded and is simply rotated by a motor, not shown, in one direction first then in the other to cause the nest transfer assembly to move reciprocally along a first horizontal path from the work station to the transfer station, where the workpiece is removed, and then back to the work station for reloading.

Figure 6:
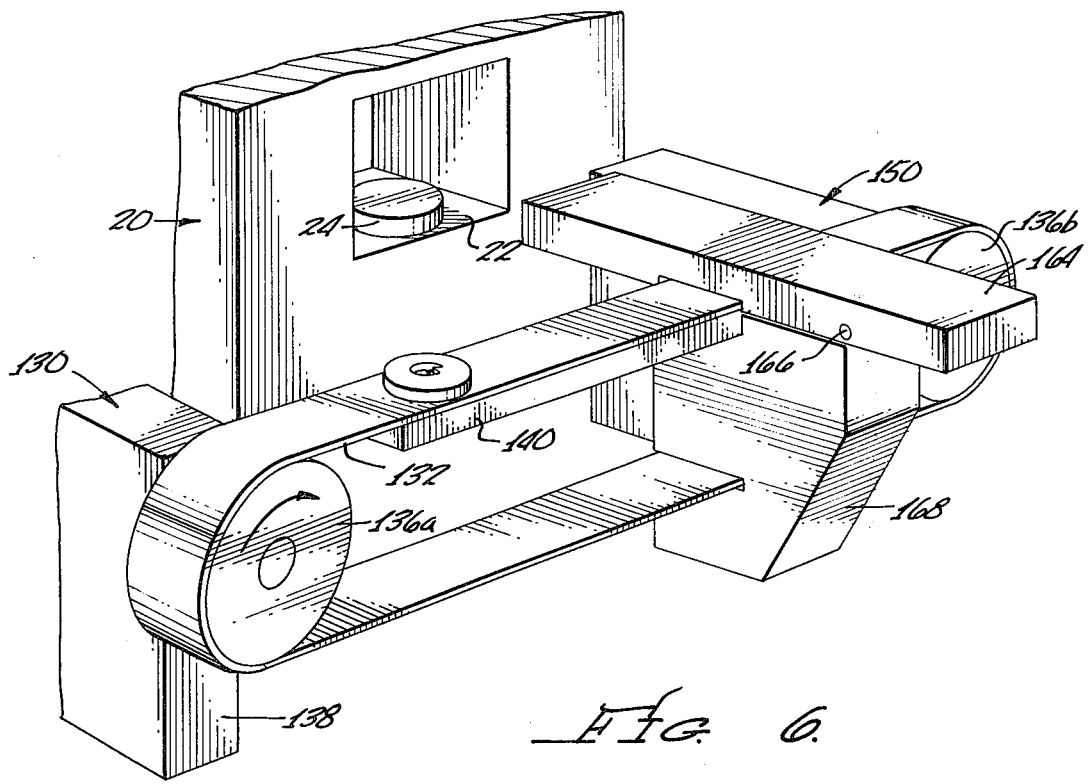
FIG. 6 is an alternative embodiment of the invention illustrating the use of a different type of transfer assembly transporting mechanism.

An equivalent machanism is illustrated in FIG. 6 in which the nest 34 is carried on a continuous belt 132, along with a plurality of other nests if desired. The continuous belt provides means for transporting the nest transfer assembly from the work station where the workpiece is loaded onto the transfer station, being carried on pulleys 136a and 136b, one or both of which may be driven, as indicated by the arrow, to transport the nest along a first longitudinal path, which does not lead to the receiving station. A positioning support shown at 140 may be provided to position the nest properly as it approaches the transfer station. The continuous belt 132 may be moved in one direction in a step function or may be moved forward and then back to cause the nest to move reciprocally from the loading station to the transfer station and then back again. The operation is, obviously, equivalent.

Figure 3:
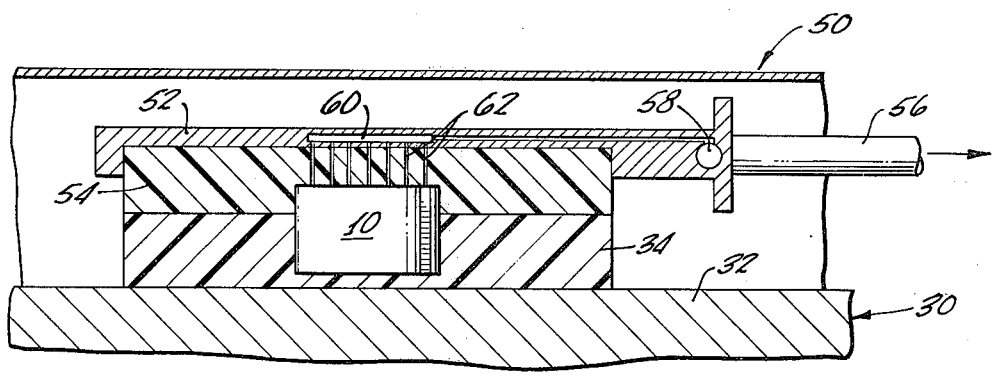
FIG. 3 is a detailed, cross-sectional view showing a portion of a preferred form of the feeder head as shown in FIG. 2, including the feeder nest picking up the workpiece from the transfer nest.

The feeder system is shown generally at 50 and includes a transfer head 50 shown in greater detail in FIG. 3, to which reference is now made, carrying a feeder nest 54. The transfer head 52 is moved reciprocally from the transfer station to the receiving station by means of a feeder head transport mechanism 56. The feeder head also includes means for applying a pick up force to the workpiece at the transfer station. This means includes a vacuum line 58, which may lead to an aspirator, a venturi, or, more conventionally, to a rotary, oil sealed vacuum pump or to a Roots blower. Any vacuum source connected to the vacuum line 58 will be satisfactory. The vacuum line 58 is connected to a vacuum manifold 60 in the head 52 which is in communication by a plurality of small passageways 62 scattered over the area of the recess in the feeder head 54 with the nest recess.

In FIG. 3, the transfer nest 34 and the feeder nest 54 are shown in pick up relationship with the workpiece 10 lying therebetween. In the illustration, the entire workpiece is received in the combined recess formed by the coordinated recesses of the transfer nest 34 and the pick up nest 54. However, it is not necessary that the nests encompass the entire workpiece. All that is necessary is that the workpiece be received in nests of sufficient depth and configurational definition as to position the workpiece properly.

Vacuum applied through vacuum line 58 and manifold 60 and through the passage of 62 to the top of the workpiece which is held in proper position by the nest 54 recess, is effective to cause the workpiece to be removed from the transfer nest recess and to be carried by the pickup head nest recess. The pickup operation is indicated schematically with the arrow in FIG. 4. The feeder head support and drive assembly 64 is mounted by pivot means, such as a pivot pin 66, on a feeder drive and lift assembly 68. The extended position of the feeder head 62 is shown in dashed lines in FIG. 4 and is shown in full lines in FIG. 5, which illustrates the position of the transfer system when the feeder head is down, depositing the workpiece on the press die 24.

The operation of the transfer system can be understood by referring to the drawings in sequence. In Drawing 1, a workpiece 10 is being placed in the nest 34 at the loading or work station. The operator who would normally occupy this station is omitted for clarity of illustration. Another workpiece 10' is shown having been deposited on the die of the punch press, or other equivalent position in another modifying machine, the feeder head 52 has been lifted up.

Once the workpiece 10 has been positioned properly in the transfer nest 34, the nest transfer assembly is moved to the right, along a first path to the transfer station. The first path does not lead to and is not directed toward the receiving station; consequently, there is no risk of the operator's hand being carried to the receiving station where it would be injured by the punch press, or other modifying machine. As the nest transfer assembly moves, to the right in FIG. 1, the feeder head and drive assembly 64 is in the up position so that the nest transfer system moves into the transfer station with the nest 34 lying below the feeder head support and drive assembly 64. During the transport of the nest transfer assembly to the transfer station, the feeder head is being retracted and lies directly above the nest transfer assembly when both the feeder head and the nest transfer assembly are in the transfer station. The transfer nest includes a recess which conforms to at least a part of one side of the workpiece transported, while the feeder nest includes a recess nest which conforms to at least the part of another side of the workpiece. Thus, when the feeder nest is lowered down over the workpiece, as illustrated in FIG. 3, and more generally in FIG. 2, the edges of the feeder nest encompass the workpiece and, when the feeder head support and disc assembly is lifted, tends to exert a lifting force on the workpiece. This lifting force may be augmented by the application of a vacuum through line 58 and manifold 60 to the passages 62 and to the workpiece. The workpiece is, therefore, lifted out of a transfer nest and carried by the feeder nest in such a position that the workpiece arrives at the receiving station in proper position.

Figure 4:
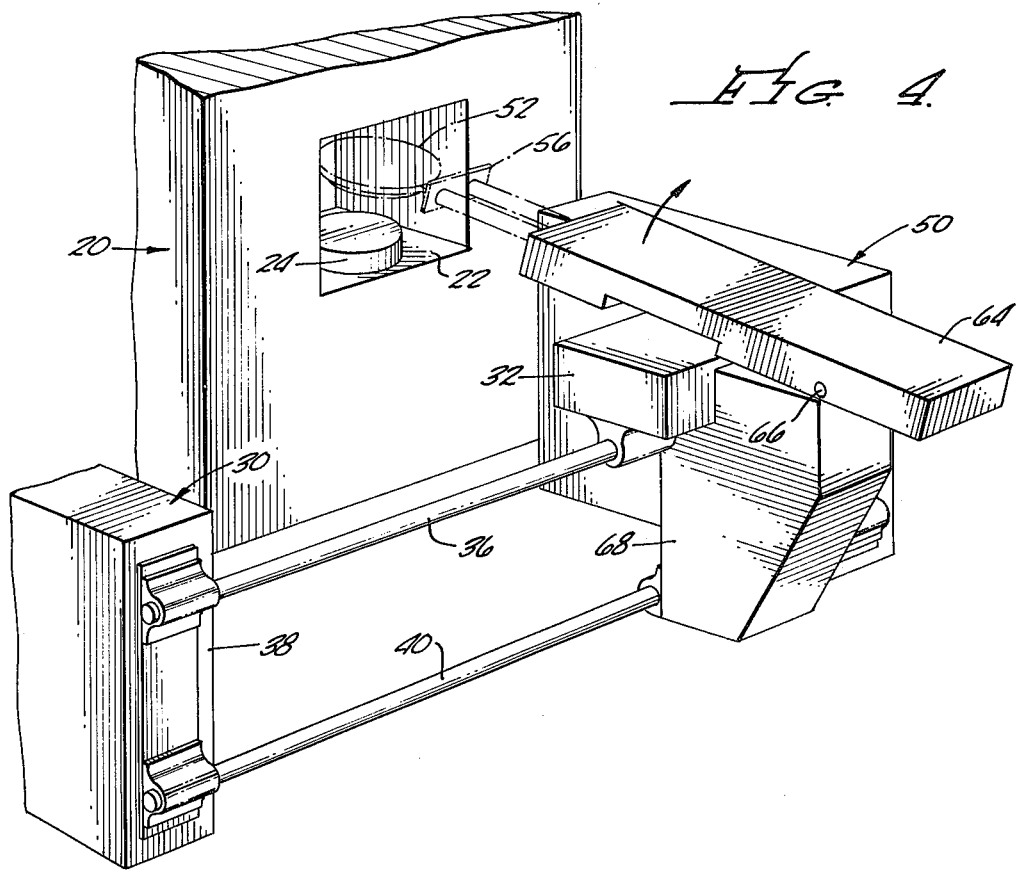
FIG. 4 is the same system illustrating in solid lines the picking up action of the feeder head and, shown by dotted lines, the transporting of the feeder head from the transfer station to the receiving station in the press.

As the feeder head support and drive assembly 64 is lifted, such as by a hydraulic or pneumatic linear motor, described hereinbefore, a cam lifter, or other mechanism of the types generally referred to hereinbefore or described in the literature incorporated herein by reference, the feeder head is transported along a second path to the receiving station, all as generally shown in FIG. 4. During this time the nest transfer assembly is being returned to the loading station.

Figure 5:
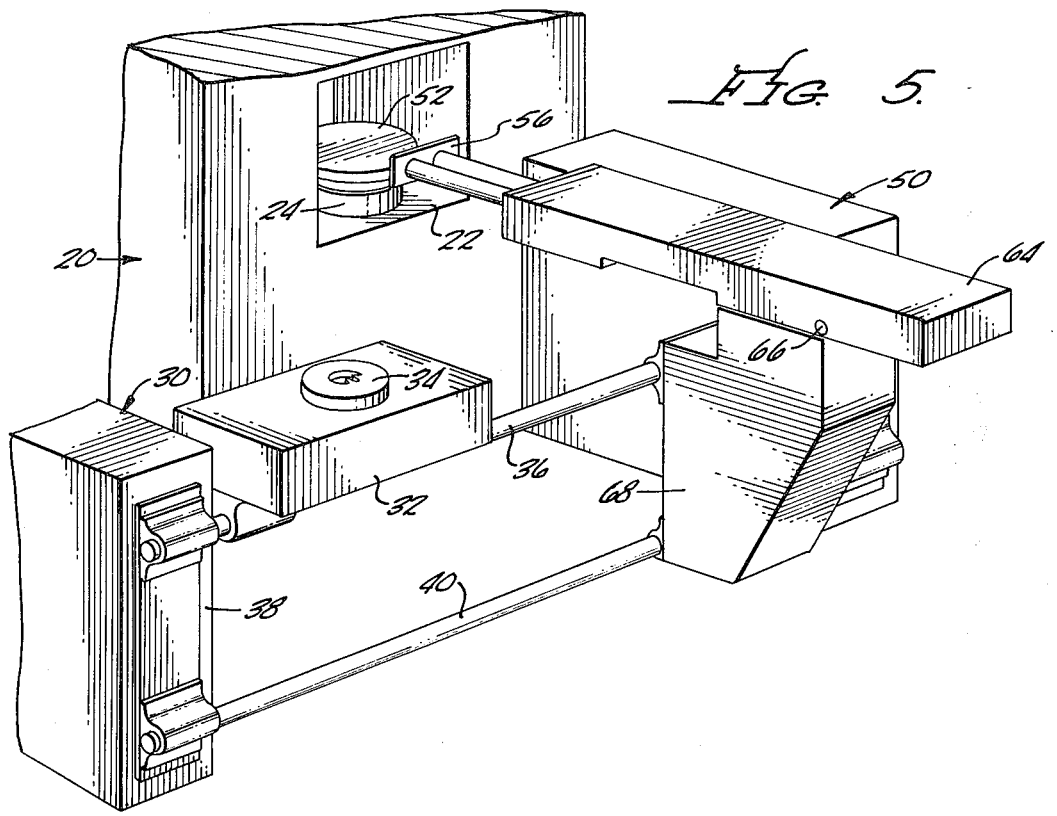
FIG. 5 is the same system showing the transfer head returning to the loading station and the feeder head depositing the workpiece at the receiving station in the press.

As illustrated in FIG. 5, once the feeder head is in the receiving station, it is lowered, positioning the workpiece on the die of the punch press in proper position with respect to the center and in proper angular orientation. The workpiece may be released by releasing the lifting force of the vacuum or it may be positively ejected by applying air pressure through the vacuum line 58, the manifold 60 and the passage 62. The alternate application of vacuum and air pressure is well known and means for accomplishing this are described and illustrated in the aforementioned incorporated references.

When the workpiece has been deposited in proper position at the receiving station, the feeder head is lifted, manually or by a mechanism of the type generally referred to, to the position shown in FIG. 1 and the cycle is repeated.

Since the first path of travel of the workpiece on the nest transfer assembly is along a first horizontal path to the transfer station and the second travel of the workpiece is along a generally horizontal path different from the first path and into the receiving station, the workers hand cannot be carried into the receiving station from the loading station. Consequently, there is no danger of injury to the worker.

In addition to protecting the worker from direct physical damage, the system of this invention permits the loading station to be located remotely from the modifying machine, thus removing the operator from the very noisy environment immediately surrounding some modifying machines. It is possible, using the present invention, even to locate the worker in a different room which may be insulated by either distance or by appropriate materials from the noise in the vicinity of the punch press or other modifying machine.

It will be apparent from the preceding discussion that it is not the details of the components which is sought to be patented, but rather the entire system, and that many equivalents may be found for the particular elements and mechanisms described or suggested for use in the system. It is contemplated that a reasonable range of equivalents will be included in the invention as defined in the following claims.

What I claim is:

1. For use in combination with a workpiece modifying machine which includes a workpiece receiving station into which the workpiece must be placed in a specific orientation and means proximate said station for modifying a workpiece, a transfer system for transferring a workpiece from a safe, external loading station to such a receiving station comprising:

a transfer nest including position defining means corresponding to the shape of one side of a workpiece for receiving a workpiece only in predetermined relationship with respect to the position in which said workpiece is to be positioned at said receiving station for being modified;

a nest transfer system for transporting said transfer nest from said loading station to a transfer station spaced from said receiving station;

a feeder nest including position defining means corresponding to the shape of another side of a workpiece for receiving said workpiece from the transfer nest only in said relationship;

means for transferring the workpiece from the transfer nest to the feeder nest in said relationship; the feeder nest being adjacent to the transfer nest during transfer and a feeder transfer system for transporting said feeder nest, with said workpiece received therein, from the transfer station to the receiving station in said position for being modified, whereby the workpiece can be placed only in said relationship in the transfer nest and said transfer means transports the workpiece to the receiving station in proper position for being modified by the workpiece modifying machine.

2. A transfer system of the type defined in claim 1 wherein:

the feeder transfer system includes means for moving the feeder nest from the transfer station to the receiving station and for applying a pick up force to the workpiece at the transfer station and releasing the pick up force at the receiving station to thereby deposit the workpiece in proper position at the receiving station.

3. A workpiece transfer system for transferring workpieces from a safe work station to a receiving station in a modifying machine without risk of injury by the modifying machine to the operator, said workpieces being positioned in the receiving station of the modifying machine in exact radial and angular orientation for being modified by said machine comprising:

a transfer assembly including means which conforms to one side of a workpiece for receiving a workpiece at the work station only in exact radial and angular relationship as defined by the position the workpiece must be at when the workpiece is received at the receiving station;

means for transferring the transfer assembly to a transfer station spaced from both the work station and the receiving station;

a feeder assembly including means which conforms to another side of a workpiece for receiving a workpiece from the transfer assembly at the transfer station only in said predetermined relationship;

means for transferring the workpiece from the transfer assembly to the feeder assembly; and means for transferring the feeder assembly from the transfer station to the receiving station for thereby transferring the workpiece to the receiving station in exact radial and angular orientation for being modified by the modifying machine.

4. A transfer system as defined in claim 3 wherein:

a transfer assembly includes a transfer nest having means of a size and configuration to receive workpieces only in a position relative to the proper position of the workpiece in the receiving station such that when transferred the workpiece will arrive at the receiving station in said proper position for being modified;

the means for transferring the transfer assembly transports the workpiece in said position along a first path which does not lead to the receiving station;

the feeder assembly includes a feeder nest having means of a size and configuration to receive workpieces only in proper position; and the means for transferring the feeder assembly transports the workpiece in said position along a second path which is different in direction from the first path.

5. A transfer system as defined in claim 3 wherein:

the transfer assembly includes a recessed transfer nest in which the recess is of a size and a shape to receive a portion of the workpiece to be transported only in a position and orientation such that when transported the workpiece arrives at the receiving station in proper position and means supporting the transfer nest for generally horizontal movement to the transfer station;

the means for transferring the transfer assembly comprises means for moving the transfer assembly along a first generally horizontal path which does not lead to the receiving station, whereby the operator's hand cannot be carried from the work station into the receiving station, to a position in the transfer station and returning the transfer nest to the work station;

the feeder assembly includes a recessed feeder nest in which the recess is of a size and shape to receive a different portion of the workpiece in said proper position and a feeder head for carrying the feeder nest to the receiving station;

the means for transferring the feeder assembly comprises means for transferring the feeder head from a position at the transfer station over the transfer assembly when the latter is at the transfer station, along a second generally horizontal path to a position in the receiving station, for depositing the workpiece at the receiving station in said proper position, and back to the transfer station.

6. A transfer system as defined in claim 5 wherein:

the means for transferring the workpiece from the transfer assembly to the feeder assembly include the feeder nest and means for moving the feeder nest down and over the workpiece for receiving said other portion of the workpiece in the recess in the feeder nest and lifting the workpiece, carried by the feeder nest, out of the transfer nest and upwardly before the transfer head begins travel along said second path.

7. A transfer system as defined in claim 6 wherein:

the means for transferring the workpiece from the transfer assembly to the feeder assembly includes means to apply pick up force to the workpiece; and the transfer and feeder nests, the transfer and feeder assemblies, and the means for transferring said assemblies are so constructed and disposed that the workpiece is maintained in such proper orientation and position during transfer such that the workpiece is received at the receiving station in proper position and orientation to be modified and such that the operator's hand cannot be transported from the work station to the receiving station by the transfer system.

* * * * *